Jan. 10, 1956   L. M. FRANCIS   2,730,400
PIVOTAL TRACK VEHICLE CARRYING TRAILER
AND METHOD OF LOADING SAME
Filed Feb. 4, 1952   3 Sheets-Sheet 3
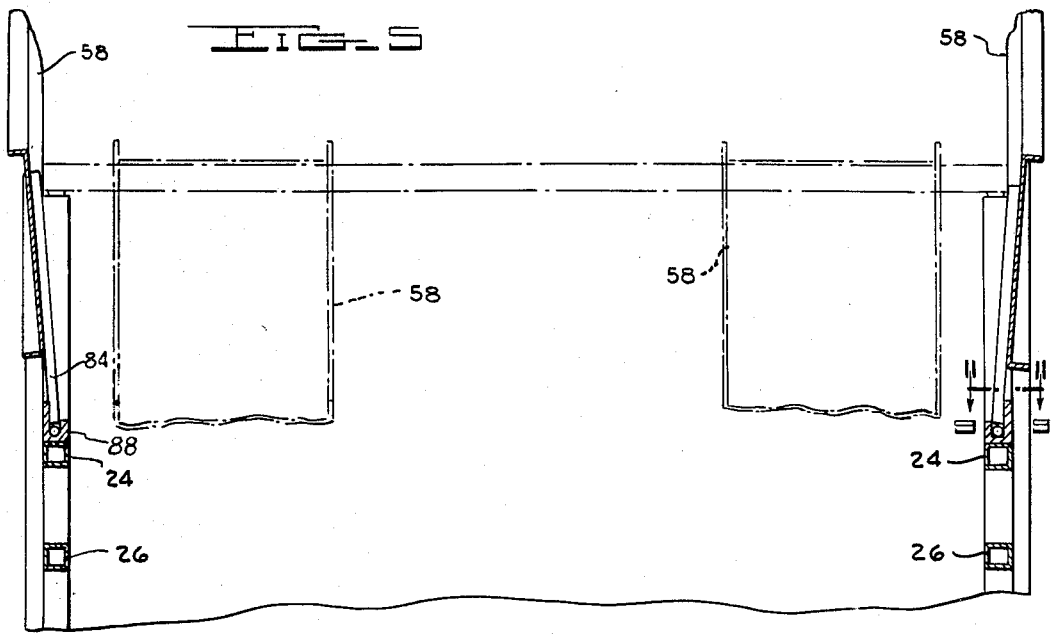
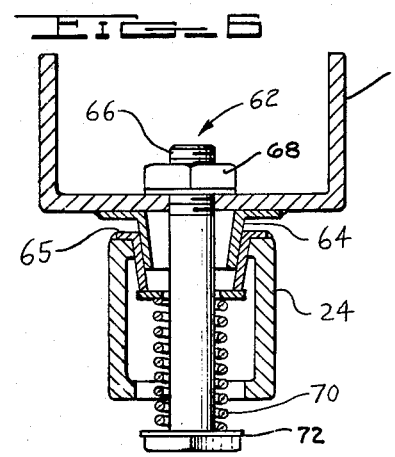
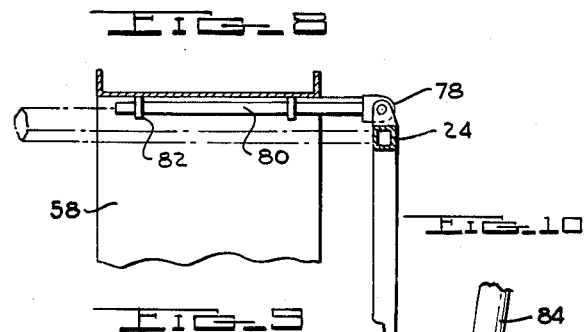
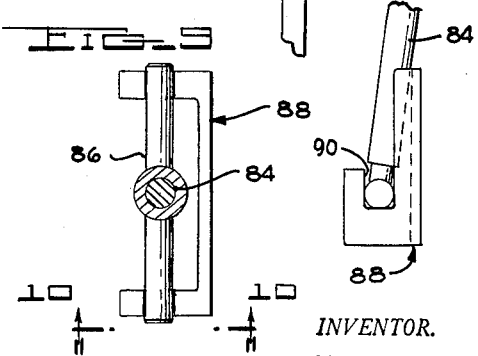
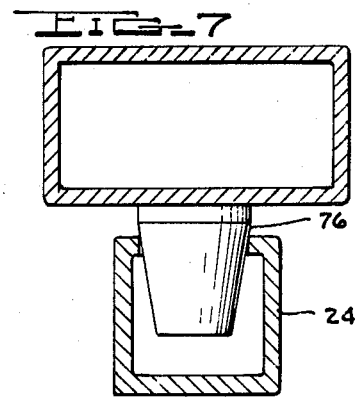
INVENTOR.
LYNN M. FRANCIS
BY
Arthur M. Smith
ATTORNEY United States Patent Office 2,730,400
Patented Jan. 10, 1956

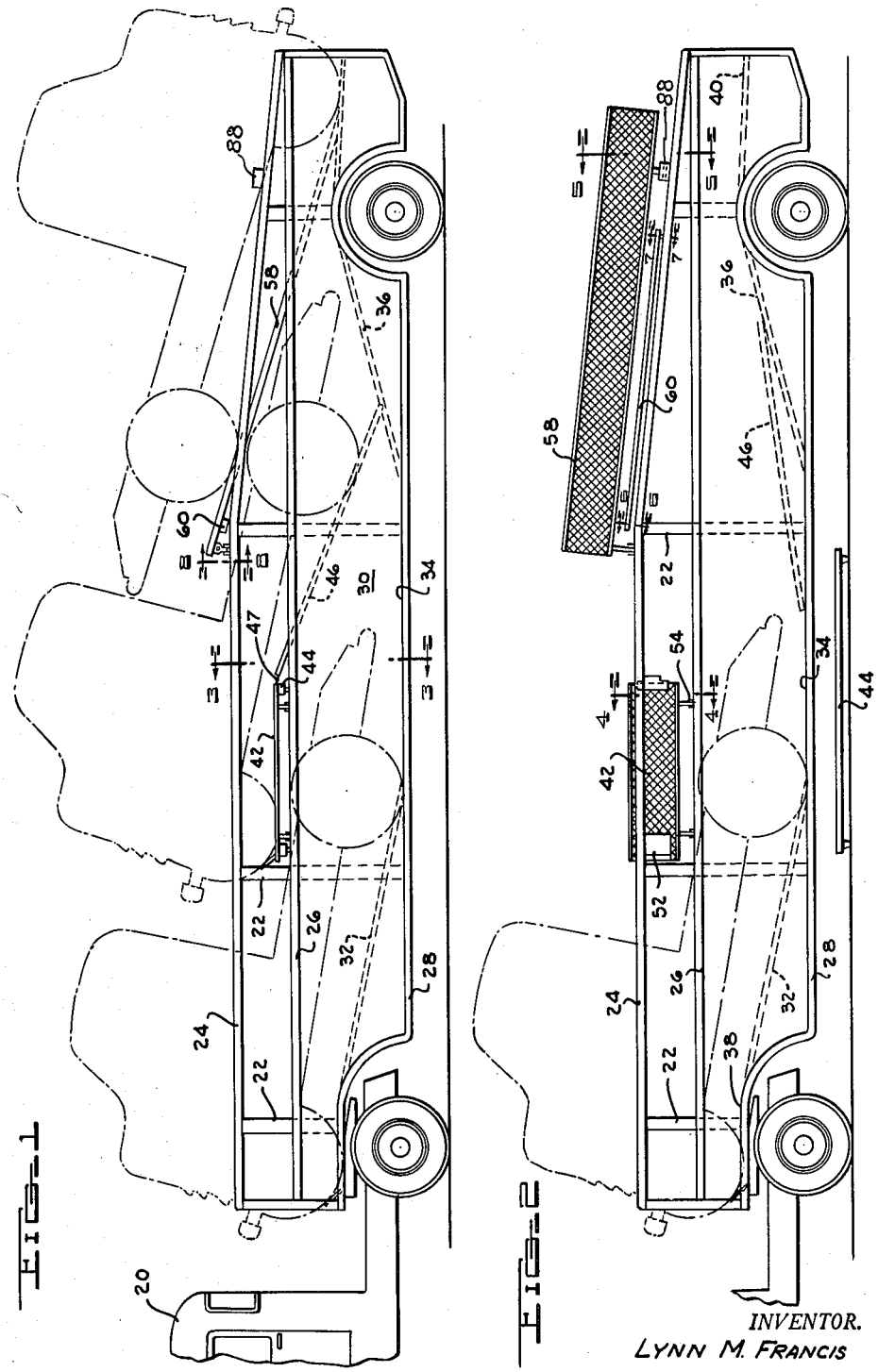

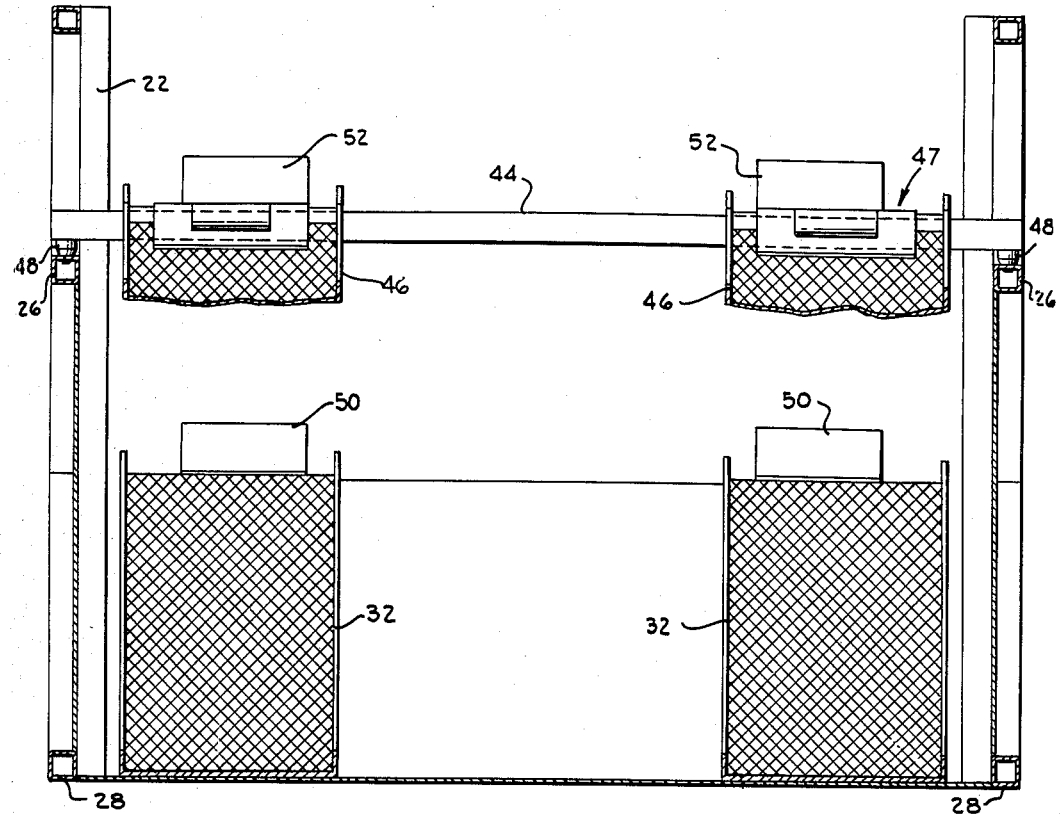
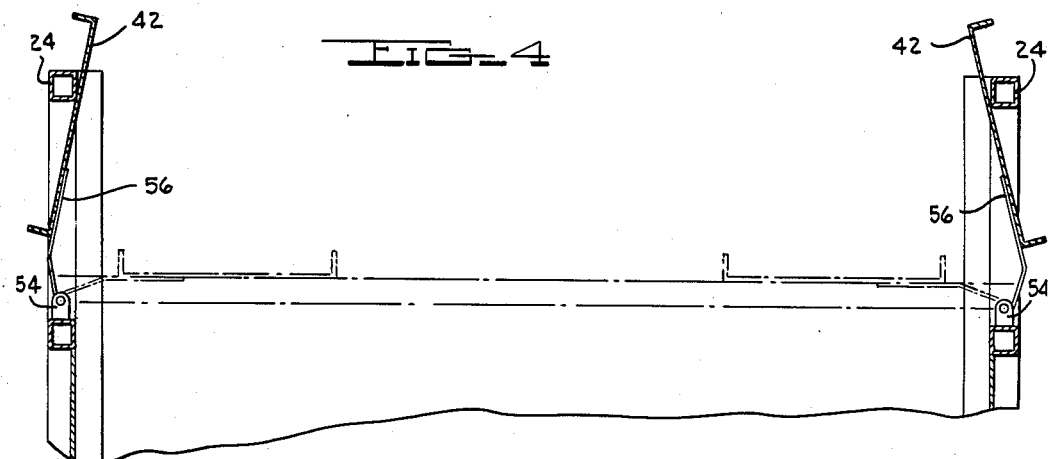

2,730,400

PIVOTAL TRACK VEHICLE CARRYING TRAILER AND METHOD OF LOADING SAME

Lynn M. Francis, Detroit, Mich., assignor to Dual-Motors Truck Company, Detroit, Mich., a corporation of Michigan Application February 4, 1952, Serial No. 269,780

3 Claims. (Cl. 296—1)

The present invention relates to a vehicle-carrying trailer and more particularly to such a trailer which is adapted to haul trucks and is so constructed as to permit easy loading and unloading of a maximum number of trucks at a minimum overall height.

The transporting of trucks in a highway trailer has been a problem since it is difficult to place more than one of these trucks on a typical transport trailer without exceeding the maximum height imposed by the government regulations and the maximum height which is permissible while still being able to clear viaducts, bridges, overpasses and the like. Trucks such as the conventional pick-up are necessarily larger than conventional automobiles and it is difficult to arrange such trucks in a manner so that sufficient number can be hauled in order to make the trip financially practical without violating the overall height restrictions.

Therefore, it is a primary object of the present invention to provide a vehicle carrier, particularly adapted for hauling trucks, in which a maximum number of vehicles may be arranged for hauling within prescribed height limitations.

It is another object of the present invention to provide a simple and efficient vehicle carrier constructed and arranged so that the vehicles may be loaded thereon and unloaded therefrom quickly and easily.

It is a further object of the present invention to provide a vehicle carrier which is adapted to carry a plurality of vehicles in an inclined position, said vehicles being substantially parallel one to the other, so that the center of gravity of the carrier and load is maintained at a relatively low position.

It is another object of the present invention to provide a vehicle carrier according to the previous object wherein the desk constructions are formed and arranged so that the vehicles may be rapidly loaded and unloaded by simple and convenient manipulation of the component parts of the various deck constructions.

Other objects of this invention will appear in the following description and appended claims, reference being had to the accompanying drawings forming a part of this specification wherein like reference characters designate corresponding parts in the several views.

In the drawings:

Fig. 1 is a side elevation of a trailer constructed according to the present invention, three trucks being shown positioned thereon in phantom.

Fig. 2 is a side elevation of the trailer construction disclosed in Fig. 1 with only the foremost truck in loaded position, the structure being arranged for unloading this truck.

Fig. 3 is a sectional view taken along the line 3—3 in the direction of the arrows, Fig. 1.

Fig. 4 is a sectional view taken along the line 4—4 in the direction of the arrows, Fig. 2, the load carrying position of the middle track being shown in phantom.

Fig. 5 is a sectional view taken along the line 5—5 in the direction of the arrows, Fig. 2, the load carrying position of the upper track being shown in phantom.

Fig. 6 is a sectional view taken along the line 6—6 in the direction of the arrows, Fig. 2.

Fig. 7 is a sectional view taken along the line 7—7 in the direction of the arrows, Fig. 2.

Fig. 8 is a sectional view taken along the line 8—8 in the direction of the arrows, Fig. 1.

Fig. 9 is a sectional view taken along the line 9—9 in the direction of the arrows, Fig. 5.

Fig. 10 is an elevation taken along the line 10—10 in the direction of the arrows, Fig. 9.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, a particular embodiment of the present invention is disclosed therein which is adapted to be applied to a tractor 20 and which embodies a supporting frame structure comprising vertical ribs 22 and substantially horizontal frame members 24 and 26 supported by a bottom frame 28. Wall panels 30 are applied to the frame structure forming the sides of the trailer between the frame members 26 and the bottom frame 28. It is to be understood that the far side of the trailer in Figs. 1 and 2 is identical with the near side.

The lower deck of the trailer comprises the forward track portions 32, the middle track portions 34, and the rear track portions 36 (Figs. 1 and 2). The forward track portions 32 have wheel seating portions 38 thereon and the rear track portions have wheel seating portions 40 thereon to seat the forward wheels of the front and rear vehicles respectively.

As shown in Figs. 1 and 2 of the drawings, the first or foremost truck is disposed on the lower deck. The foremost truck is loaded and unloaded onto the trailer when the middle and upper decks are pivoted to the positions shown in Fig. 2. The construction of the middle and upper decks will be discussed hereafter in detail.

The details of construction of the middle deck are particularly set out in Figs. 1, 2, 3 and 4 of the drawings. The middle deck in the load carrying position disclosed in Fig. 1 comprises the pivotal flat tracks 42, the removable cross bar 44, and the removable tracks 46. In order to load and unload the foremost truck in the trailer, the component parts of the middle deck are positioned as shown in Fig. 2 of the drawings. The removable tracks 46 are removed from their detachable connections 47 with the flat tracks 42 (Fig. 1) and are placed with one end against the rear track portions 36 of the bottom deck and with the other end against the middle track portions 34 of the lower deck. Thus, the removable tracks 46 become a means for facilitating the driving of the foremost truck into and out of the carrying position. The detachable connections 47 shown in Figs. 1 and 3 comprise complemental hinge portions which are held in place by a removable pin. It will be noted that the removable cross bar 44 is moved out of the carrying position and the flat tracks 42 are pivoted out of the way.

The details of the cross bar 44 of the middle deck are more clearly shown in Fig. 3 of the drawings. Referring to Fig. 3, the removable cross bar 44 is shown with a downwardly extending pin 48 on each end thereof. These pins are adapted to fit in holes provided in the horizontal frame members 26. The pins 48 are provided with tapered end portions so that the pins may be quickly and easily fitted into position in the holes and will remain firmly engaged therein. Suitable stops 50 and 52 are shown on the track portions 32 and 42 for holding the trucks in the carrying position. The stops are preferably of the folding type so that they may be pivoted to an out of the way position such as disclosed in connection with the stop 52 in Fig. 2.

The details of the pivotal flat tracks 42 are set out in Fig. 4 of the drawings. The position of the flat tracks 42 supported on the cross bar 44 is shown in phantom in this view. The inoperative position of the flat tracks 42 is shown in solid lines. Each flat track 42 is pivoted at 54 to the horizontal frame member 26. A pivot arm 56 extends from the pivot 54 and is affixed to the bottom of the flat track 42. Thus, the flat tracks 42 are pivoted to the upper position shown in solid lines in Fig. 4 when it is desired to load or unload the foremost truck. In this position, the tracks 42 are disposed against the horizontal frame members 24. After the foremost truck is loaded into position, the cross member 44 is placed in position (Figs. 3 and 4) and the flat tracks 42 are pivoted downwardly to the carrying position (Fig. 3 and phantom position in Fig. 4).

The details of the upper track, which is adapted to seat the rearmost car in carrying position, are particularly disclosed in Figs. 1, 2, 5, 6, 7, 8, 9, and 10 of the drawings. The open position of the upper deck is disclosed in Figs. 2 and 5 of the drawings. In this position, the first and second trucks may be loaded to or unloaded from the carrying position. The carrying position of the upper deck is disclosed in Fig. 1 of the drawings.

The upper deck comprises broadly the pivotal tracks 58 and a pivotal cross bar 60. The cross bar 60 pivots transversely of the trailer. The supporting position of the cross bar whereby it supports the tracks 58 in carrying position is disclosed in Fig. 1 and in phantom in Fig. 5. The cross bar extends transversely of the trailer in this position. The inoperative position of the cross bar is indicated in Fig. 2 of the drawings. In this position the cross bar is swung laterally until it maintains the longitudinal position and rests on the substantially horizontal frame member 24 (Fig. 2).

Further details of the cross member 60 are disclosed in Figs. 6 and 7 of the drawings. It will be noted that the foremost end of the cross bar 60 is disposed about a spring loaded pivot 62 (Fig. 6). The cross bar 60 is provided with a downwardly extending lug 64 that is provided with a hole through the center thereof which mates with a hole in the frame member 24. A socket member 65 is disposed within the hole in the frame member 24 and seats the lug 64. A bolt 66 is disposed through the mated holes and is held in position by the nut 68. A spring 70 is positioned over the bolt adjacent the head thereof and is compressed between a washer 72 and one end of the socket 65. The spring loaded pivot 62 is disposed substantially within the horizontal frame member 24.

The other end of the cross member 60 is disclosed in Fig. 7 of the drawings. The cross member in this view is in the inoperative position (Fig. 2). A lug 76 depends downwardly from the cross bar 60 and seats in a hole provided in the substantially horizontal frame member 24. The lug 76 is tapered to facilitate positioning of the said lug in the hole and to assure a secure engagement of the lug in the hole. Although it is not shown in the drawings, a hole is positioned in the far frame member 26 in Fig. 1 so that when the cross bar 60 is swung to the operative position, the lug 76 will seat in this frame member.

Comparing the carrying position of the tracks 58 in Fig. 1 with the inoperative position in Fig. 2, it will be seen that the said tracks must be pivotal about a transverse and vertical axis as well as a substantially longitudinal axis in order that the rearmost portions of the tracks 58 may attain the positions shown in Figs. 1 and 2.

Figs. 5, 9 and 10 disclose the particular arrangement for permitting movement of the tracks 58 about a substantially longitudinal axis. Referring to Figs. 5 and 8, it will be noted that each track 58 may be pivoted from the carrying position shown in Fig. 8 (the cross bar 60 being shown in phantom) to the inoperative position shown in Fig. 5 by pivoting the track about the pivot 78 which is affixed to the frame member 24. The pivot 78 permits movement about a longitudinal and vertical axis, and the foremost end of the track 58 is pivotal about the pivot rod 80 (Fig. 8). The track 58 is provided with the lugs 82 which are rotatably seated on the rod 80. Thus, the rear portion of the track 58 is free to be pivoted about a substantially transverse axis.

The rear portion of each track 58 is particularly disclosed in Figs. 5, 9, and 10. Each track 58 has a pivot arm 84 affixed thereto which extends therefrom and is seated in a T-bar 86 (Fig. 9). The cross arm of the T-bar 86 is seated in a bracket 88 which is affixed to the frame member 24. It will be noted in Fig. 10 that the bracket 88 has slots 90 formed therein which are open on top. This construction permits the pivoting of the T-bar 86 within the bracket 88 and also permits lifting of the T-bar 86 from the bracket 88 when it is desired to place the rear portion of the track 58 in the position indicated in Fig. 1 of the drawings.

A more related description of the loading and unloading operations of the trailer of the present invention is as follows:

To load the trailer, the middle deck is moved out of the way by uncoupling the tracks 46 from the tracks 42 by unlocking the connection 47 and placing the track portions 46 in the position shown in Fig. 2. The cross bar 44 is removed from its seated position shown particularly in Figs. 1 and 3 of the drawings. The tracks 42 are then pivoted about the hinge or pivot constructions 54 (Figs. 2 and 4) to the open position (Figs. 2 and 4). The upper deck is moved out of the way by lifting the rear portion of the tracks 58 from the position shown in Fig. 1 about the pivot bars 80 (Fig. 8) so that the T-bars 84 are disposed in the slots 90 of the brackets 88 (Fig. 10). The tracks 58 are then pivoted about the pivots 78 (Fig. 8) and the cross arm of the T-bar 86 is pivoted within the slots 90 so that the tracks 58 assume the open position indicated in Figs. 2 and 5 of the drawings.

The first vehicle is then run up a ramp (not shown) which is placed against the rear end of the trailer and travels over the track portion 36, the removable tracks 46, the center track 34, and up the forward track 32. The front wheels of the first truck are held in position on the seating portion 38 by any suitable stopping means, and the rear wheels of the first truck are held in position on the center track 34 by suitable stopping means.

The cross bar 44 is seated laterally between the oppositely disposed frame members 26 as shown in Fig. 3. The tracks 42 are then pivoted about their pivots 54 and are supported on the cross bar 44 as shown in Fig. 1 and in phantom, Fig. 4. The removable tracks 46 are removed from the position indicated in Fig. 2 of the drawings and are placed in the position indicated in Figs. 1 and 3 by attaching the cooperating hinge or coupling portions in place. The second car is then moved up the ramp (not shown), over the track portion 36, and up the removable tracks 46 until the front wheels of the truck engage suitable stops. Any suitable stopping means may be used to hold the rear wheels of the second truck in position on the track portions 46.

The tracks 58 are then pivoted about the pivots 78 and brackets 88 from the position indicated in Fig. 2 to a flat position at which time the T-bars 86 are moved upward and out of the slots 90 in the bracket 88 (Fig. 10) about the pivot rods 80 (Fig. 8). The tracks are moved inward about the pivot 78 (Fig. 8) and are pivoted downward about the pivot rods 80 until the rear portions of the said tracks 58 engage the seating portion 40. The last truck is then backed up the ramp (not shown) until the front wheels thereof are in position on the seating portion 40. Suitable stopping means are used to hold the front and rear wheels in carrying position.

Unloading of the trucks is accomplished by simply reversing the procedure and carrying out the pivoting and moving operations of the structural members of the trailer in the same manner as in loading but in a different sequence.

From the foregoing it will be seen that I have provided a simple and sturdy trailer which is particularly adapted for carrying trucks and which may be quickly and easily loaded and unloaded. Although the structure disclosed in the drawings is particularly adapted for use with trucks and other large vehicles which are hauled in a transport trailer, it will readily be understood that the same construction can be applied to trailers for hauling automobiles or other vehicles without departing from the spirit of my invention.

Having thus described my invention, I claim:

1. A truck hauling highway trailer adapted to carry three trucks in an inclined position, said trucks being substantially parallel one to the other, comprising spaced side frames and a plurality of decks therebetween, a lower deck having a forward inclined track portion, a flat central track portion, and a rear inclined track portion, a middle deck having a pair of flat tracks, one pivotally attached to each of said side frames, a removable cross bar which is disposed beneath the said tracks and extends between said side frames in the supporting position, and a pair of detachable tracks, one attached to the rear portion of each of said flat tracks in the carrying position, said cross bar and removable tracks being removed and said flat tracks being pivoted toward said side frames when loading or unloading the forward vehicle, and an upper deck including a pair of tracks each pivotal about longitudinal, transverse and vertical axes and affixed to one of said side frames at its forward end and having a pivot arm extending from the rear portion thereof with a T-joint thereon, a pair of pivot seat brackets having open top slots therein affixed one to each of said side frames and adapted to pivotally seat the T-joint of one of said tracks so that the tracks may be pivoted toward said side frames to permit loading and unloading of the first two vehicles, the rear portions of said tracks being disposed on the rear inclined portion of said lower deck in the loaded position, a cross bar pivotally attached at one end to one of said side frames, and seating means in the other of said side frames adapted to seat the other end of said cross bar in the supporting position.

2. A vehicle carrier adapted to carry a plurality of vehicles, including spaced side frames and decks disposed between said side frames, one of said decks comprising a pair of tracks each affixed at its forward end to one of said side frames through a first joint to permit pivotal movement about transverse, longitudinal and vertical axes, a pair of T-bars one extending from the rear of each of said tracks, a pair of second joints formed by a pair of pivot seat brackets each having an open top slot therein and affixed one to each of said side frames at the top thereof, said slots extending longitudinally of the trailer and the cross bar of each said T-bar being seated in one of said slots in said brackets in the unloaded position, each track being pivotal at its forward end about said first joint and at its rearward end by the rotation of the cross bar of said T-bar in the slot of the pivot seat bracket about an axis extending substantially in the same direction as the longitudinal axis of the trailer, said first joint and second joint permitting movement of each track so that the rearward end of said track may be simply lifted from the pivot seat bracket and moved down to the loaded position, and support means adapted to support said tracks in the loaded position and being movable out of the way in the unloaded position.

3. A vehicle carrier adapted to carry a plurality of vehicles, including spaced side frames and decks disposed between said side frames, one of said decks comprising a pair of tracks each affixed at its forward end to one of said side frames through a first joint to permit pivotal movement about transverse, longitudinal and vertical axes, a pair of T-bars one extending from the rear of each of said tracks, a pair of second joints formed by a pair of pivot seat brackets each having an open top slot therein and affixed one to each of said side frames at the top thereof, said slots extending longitudinally of the trailer and the cross bar of each said T-bar being seated in one of said slots in said brackets in the unloaded position, each track being pivotal at its forward end about said first joint and at its rearward end by the rotation of the cross bar of said T-bar in the slot of the pivot seat bracket about an axis extending substantially in the same direction as the longitudinal axis of the trailer, said first joint and second joint permitting movement of each track so that the rearward end of said track may be simply lifted from the pivot seat bracket and moved down to the loaded position, a cross bar pivotally attached at one end to one of said side frames, and seating means in the other of said side frames adapted to seat the other end of said cross bar in the supporting position.

References Cited in the file of this patent

UNITED STATES PATENTS

| | | |
|---|---|---|
| 1,824,370 | Reid | Sept. 22, 1931 |
| 1,840,705 | Eichelberger | Jan. 12, 1932 |
| 1,887,325 | Pratt et al. | Nov. 8, 1932 |
| 1,900,590 | Simning | Mar. 14, 1933 |
| 1,901,103 | Judd | Mar. 14, 1933 |
| 2,009,149 | Pierce | July 23, 1935 |
| 2,146,567 | Dondlinger | Feb. 9, 1939 |
| 2,452,270 | Stuart | Oct. 26, 1948 |
| 2,492,980 | Garnett | Jan. 3, 1950 |
| 2,636,772 | Bridge | Apr. 28, 1953 |